April 3, 1951 H. A. BROOS 2,547,739

CIRCUIT-ARRANGEMENT FOR TONE CONTROL IN A LOW FREQUENCY AMPLIFIER

Filed Dec. 6, 1947 2 Sheets-Sheet 1

H. A. BROOS
INVENTOR
BY Fred M Vogel
AGENT

April 3, 1951 | H. A. BROOS | 2,547,739

CIRCUIT-ARRANGEMENT FOR TONE CONTROL IN A LOW FREQUENCY AMPLIFIER

Filed Dec. 6, 1947 | 2 Sheets-Sheet 2

H. A. BROOS
INVENTOR

BY

AGENT

Patented Apr. 3, 1951

2,547,739

UNITED STATES PATENT OFFICE 2,547,739

CIRCUIT ARRANGEMENT FOR TONE CONTROL IN A LOW-FREQUENCY AMPLIFIER

Henricus Adrianus Broos, Eindhoven, Netherlands, assignor to Hartford National Bank and Trust Company, Hartford, Conn., as trustee Application December 6, 1947, Serial No. 790,102
In the Netherlands October 25, 1946

5 Claims. (Cl. 179—171)

The invention relates to a circuit-arrangement for tone-control in a low-frequency amplifier comprising at least one amplifier valve, particularly an amplifier suitable for use in the final stage of a wireless receiving set. The term tone-control is to be understood to mean here that the form of the characteristic curve indicating the gain of the amplifier as a function of frequency can be controlled.

Figure 1:
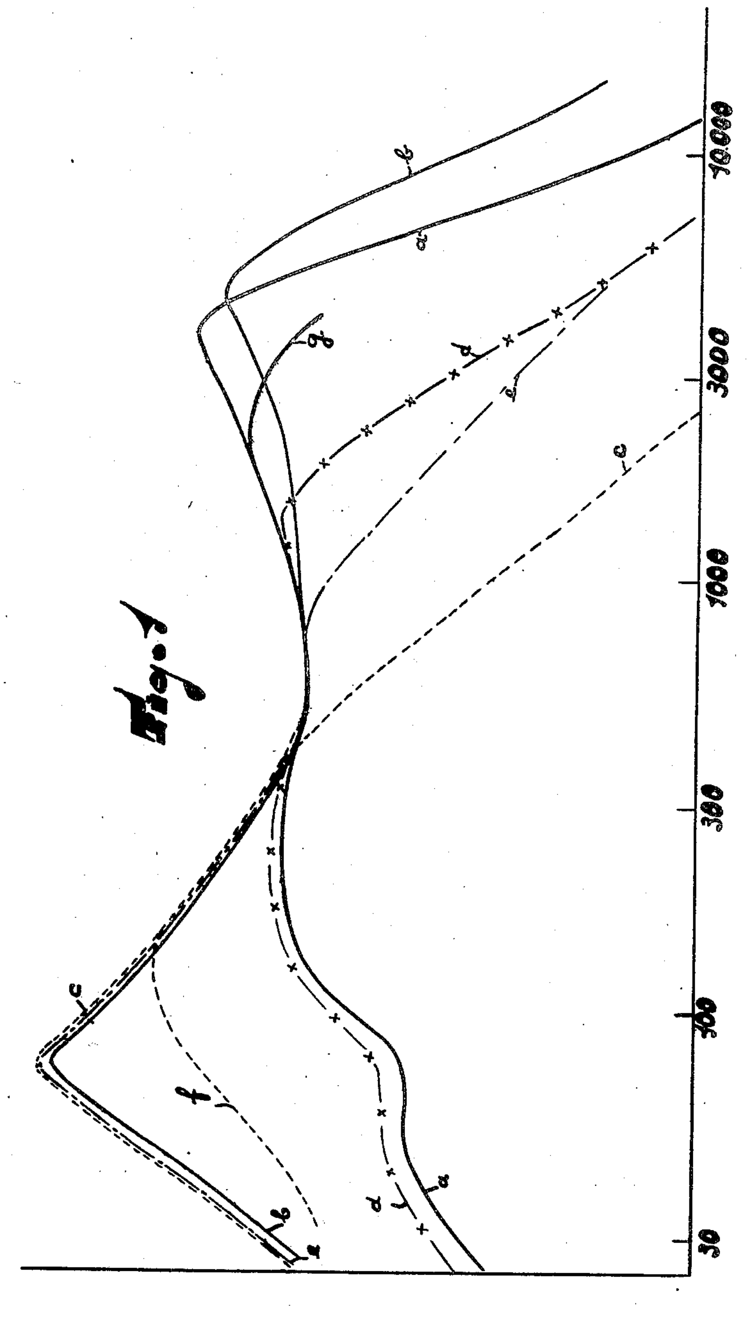

It is found possible in practice to divide the desired forms of amplification characteristic curve into three groups and this is explained more fully with reference to the curves shown in Fig. 1.

For reproduction of speech it is in general desirable that, going from low to high frequencies, the amplification should increase evenly in accordance with the characteristic curve *a* of Fig. 1.

For reproduction of music, on the contrary, it is in general desirable that both the low and the high tone frequencies should be amplified to a greater extent than the intermediate tone frequencies, as is indicated by the characteristic curve *b*.

Finally, if the amplifier constitutes the final stage of a wireless receiving set it will be desirable, in order that, when receiving a weak station, interfering frequencies from a neighbouring station may not be a source of trouble, high tone frequencies should be cut off, which will be referred to as "dull reproduction." In this case the amplification characteristic curve exhibits the shape of curve *c* of Fig. 1.

In known circuit-arrangements a low-frequency amplifier is provided with various negative feed-back circuits which are adapted to be completed at will by means of a commutator and which are proportioned such that the amplification characteristic curve may assume each of the forms shown in Fig. 1 by the curves *a*, *b* and *c*.

The disadvantage of such circuit-arrangements is that the greater the number of negative feed-back circuits to be completed, the greater the number of circuit elements required, which renders the circuit-arrangement expensive. This disadvantage is obviated in a circuit-arrangement comprising two, if necessary, mechanically coupled, continuous controls, one of which controls the amplification of the low tone frequency range and the other that of the high tone frequency range.

A circuit-arrangement of this kind comprises a comparatively large number of circuit elements, more particularly, at least two variable control impedances.

The object of the invention is to provide a circuit-arrangement of the aforesaid kind with continuous control which comprises a small number of circuit-elements, more particularly only one tone control potentiometer.

According to the invention, for this purpose a negative feed-back voltage derived from the voltage across a potentiometer and varying with frequency, the variation with frequency being dependent on the position of the sliding contact of this potentiometer, is made effective in the grid circuit of at least one of the amplifier valves included in the amplifier and one of two fixed contacts of this potentiometer has supplied to it via a low-tone frequency bandpass filter and the other fixed contact via an intermediate tone frequency bandpass filter a voltage which is proportional to the output voltage of the amplifier.

Figure 2:
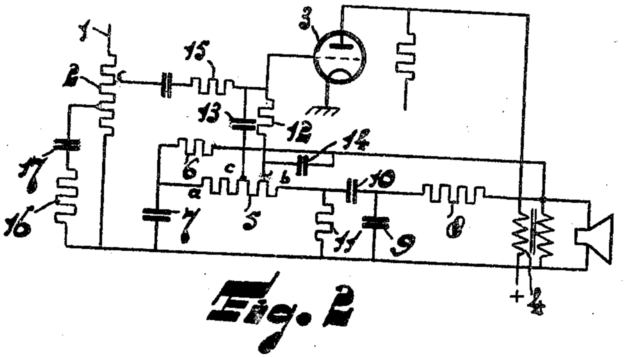
Figure 3:
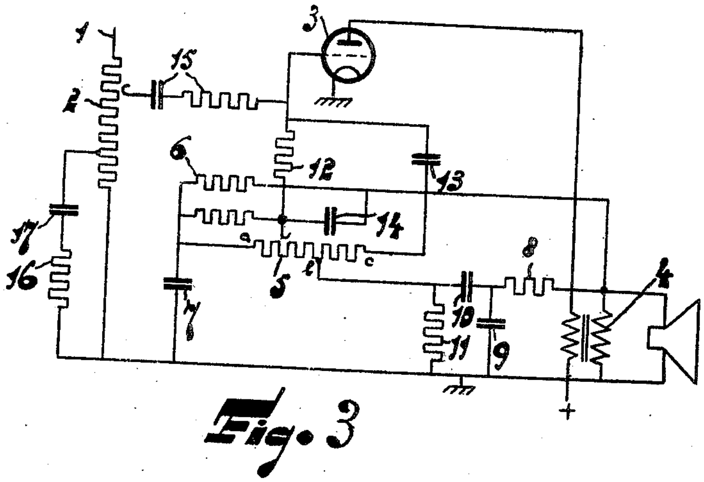
Figure 4:
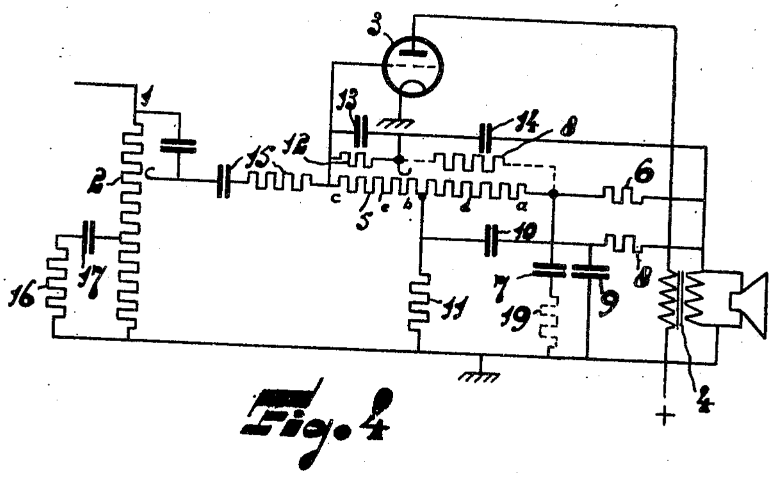

In order that the invention may be more clearly understood and readily carried into effect, it will now be described more fully with reference to the accompanying drawing, in which Figs. 2, 3 and 4 show circuit-arrangements according to the invention.

Referring to the figures, the voltage to be amplified is supplied via a lead 1 and a potentiometer 2 operating as a gain control to the control-grid of an amplifier valve 3, the anode circuit of which comprises an output transformer 4 and a reproduction apparatus. Made effective in the grid circuit of the tube 3 is a frequency-dependent negative feed-back voltage which is obtained from a high-ohmic potentiometer 5, the resistance of which exceeds, for example, 0.1 megohm and which operates as a tone-control, with the result that the amplification characteristic curve of the circuit-arrangement exhibits a form which depends on the position of the sliding contact of the potentiometer 5. According to the invention, for this purpose, the voltage set up across the secondary winding of the output transformer 4 is supplied, via a low tone frequency filter 6—7 or an intermediate tone frequency filter 8—9—10—11 respectively to two fixed contacts *a* and *b* respectively of the potentiometer 5.

In the circuit-arrangement shown in Fig. 2 the grid of the tube 3 is connected via a high-ohmic resistance 12 (the value of which exceeds for example 0.1 megohm) to the sliding contact of the potentiometer 5. Accordingly, if this sliding contact is located in the proximity of the fixed contact "*a*" the low tone frequencies will be negatively feedback, if it is in the proximity of the fixed contact "*b*" the intermediate tone frequencies, will be negatively fed back to a marked extent, in accordance with the characteristic curves "a" and "b" of Fig. 1.

Furthermore, the grid of tube 3 is connected via a small condenser 13 (having a capacity, of, for example, less than 50 pFs) which suppresses the phase displacement of the high tone frequencies, to a third fixed contact "c" of the potentiometer 5, whereas the sliding contact of this potentiometer is connected through a slightly larger condenser 14 to the unearthed terminal of the secondary winding of the output transformer 4. Consequently, if the sliding contact of the potentiometer 5 is in the proximity of the fixed contact "c", the high tone frequencies will be negatively fed back to a marked extent, in accordance with the amplification characteristic curve c of Fig. 1, since in this position of the sliding contact the circuit 13, 14 constitutes a comparatively low impedance for the high tone frequencies of the voltage set up across the secondary side of the output transformer 4.

A variant in this circuit diagram is obtained by interchange of the connection of the condenser 13 to the fixed contact "c" and that of the condenser 14 to the sliding contact of the potentiometer 5.

A further variant in the circuit-diagram of Fig. 2 is shown in Fig. 3, in which the fixed contacts "b" and "c" have changed places. Since the variation of the form of the amplification characteristic curve is greatest in the proximity of the middle fixed contact of the potentiometer 5, the position for "dull reproduction" is most critical in the circuit diagram of Fig. 2, the position for musical reproduction in that of Fig. 3.

Protection for the physiological control which is furthermore included in these circuit diagrams and in which the high tone frequency bandpass filter 16, 17 is connected in parallel with a fixed part of the volume control 2, so that at a low position of this potentiometer the high tone frequencies are amplified to a less marked extent is not claimed.

In the circuit diagram of Fig. 4 shows a further method of abstracting the voltage to be fed to the grid of the amplifier valve 3 from the voltage across the potentiometer 5. For this purpose the grid of this tube 3 is electrically connected to the fixed contact c of the potentiometer 5 and a grid resistance 12 is connected together with a phase-correcting parallel condenser 13 between this grid and the sliding contact of the potentiometer 5, said sliding contact being connected through a condenser of comparatively low value (for example 300/1000 pF) to the secondary winding of the transformer 4. The other circuit elements are similar to those of the circuit-diagram of Fig. 3.

This circuit-arrangement operates as follows:

If the sliding contact of the potentiometer 5 occupies position a, the low tone frequencies will again be negatively fed back to a marked extent. The high frequencies of the voltage across the sliding contact exhibit a small amplitude, in spite of the condenser 14 forming a small impedance for these frequencies, due to the fact that the condenser 7 practically constitutes a short-circuit. Thus an amplification characteristic curve is produced in which only the low tone frequencies are suppressed in accordance with the curve a of Fig. 1.

The same argument applies to position "b" of the sliding contact of the potentiometer 5 and the curve b of Fig. 1, the series combination of the condensers 10 and 9 again practically constituting a short-circuit for the high tone frequencies.

In position "c" of the sliding contact of the potentiometer 5 the high tone frequencies are strongly suppressed not only because the entire negative feed-back voltage for these frequencies is supplied through the condenser 14 to the grid of the tube 3, but also because these tone frequencies are abstracted from the input voltage by reason of the filter formed by the input impedance 15 and the capacity 14.

The high tone frequencies are furthermore suppressed to a smaller extent in the intermediate positions "d" and "e", since at the sliding contact a certain high tone frequency voltage is produced and the condenser 13 forms a comparatively small impedance for these frequencies. The amplification characteristic curves associated with these positions are shown in Fig. 1 by curves d and e respectively.

The invention is not confined to the embodiments given by way of example; thus, for example, a high-ohmic resistance 18 or a low-ohmic resistance 19 may be included in the circuit-arrangement shown in Fig. 4, which results in the amplification characteristic curves f and g respectively.

Neither is it necessary to abstract all the voltages supplied to the various filters from a voltage source proportion to the output voltage, in the present case the secondary winding of the transformer 4 but this winding may, for example, be provided with tappings, so that the intermediate tone frequency filter 8—9—10—11 has applied to it a higher voltage than the high tone frequency filter condenser 14.

It is self-evident that in the case of radio reception the tone control indicated is adapted to be mechanically coupled with a bandwidth control, with the result that interference frequencies of a neighbouring transmitter can be suppressed to an even greater extent than with the tone control referred to alone.

What I claim is:

1. An electrical circuit arrangement for amplifying an input signal voltage having frequency components within a given range, comprising an electron discharge tube having an input circuit and an output circuit, a source of said input signal voltage, means to continuously vary the amplitude of said signal voltage comprising a first potentiometer element intercoupling said source and said input circuit, and means to vary the frequency response of said amplifying arrangement comprising a second potentiometer element having a pair of fixed contacts and a movable contact, means to derive from said output circuit a first negative feedback voltage comprising the low frequency portion of said given range of frequencies, means to derive from said output circuit a second negative feedback voltage comprising the intermediate frequency portion of said given range of frequencies, means to apply said first and second negative feedback voltages each to a respective one of said fixed contacts of said second potentiometer and means intercoupling said movable contact of said second potentiometer and the input circuit of said discharge tube.

2. An electrical circuit arrangement for amplifying an input signal voltage having frequency components within a given range, comprising an electron discharge tube having an input circuit and an output circuit, a source of said input signal voltage, means to continuously vary the amplitude of said signal voltage comprising a first potentiometer element intercoupling said source and said input circuit, and means to vary the frequency response of said amplifying arrangement comprising a second potentiometer element having three fixed contacts and a movable contact, means to derive from said output circuit a first negative feedback voltage comprising the low frequency portion of said given range of frequencies, means to derive from said output circuit a second negative feedback voltage comprising the intermediate frequency portion of said given range of frequencies, means to derive from said output circuit a third negative feedback voltage comprising the high frequency portion of said given range, means to apply said first, second and third negative feedback voltages each to a respective one of said fixed contacts of said second potentiometer and means intercoupling said movable contact of said second potentiometer and the input circuit of said discharge tube.

3. An electrical circuit arrangement for amplifying an input signal voltage having frequency components within a given range, comprising an electron discharge tube having an input circuit and an output circuit, a source of said input signal voltage, means to continuously vary the amplitude of said signal voltage comprising a first potentiometer element intercoupling said source and said input circuit, and means to vary the frequency response of said amplifying arrangement comprising a second potentiometer element having three fixed contacts and a movable contact, means to derive from said output circuit a first negative feedback voltage comprising the low frequency portion of said given range of frequencies, means to derive from said output circuit a second negative feedback voltage comprising the intermediate frequency portion of said given range of frequencies, means to apply said first and second negative feedback voltages each to a respective one of said fixed contacts of said second potentiometer, first and second impedance elements each having a relatively high impedance value at said low and intermediate frequency portions of said given range and a relatively low impedance value at the high frequency portion of said given range, said first impedance element intercoupling said output circuit and said movable contact and said second impedance element intercoupling the third one of said fixed contacts and said input circuit to apply to said input circuit a third negative feedback voltage comprising the high frequency portion of said given range of frequencies and means intercoupling said movable contact of said second potentiometer and the input circuit of said discharge tube.

4. An electrical circuit arrangement for amplifying an input signal voltage having frequency components within a given range, comprising an electron discharge tube having an input circuit and an output circuit, a source of said input signal voltage, means to continuously vary the amplitude of said signal voltage comprising a first potentiometer element intercoupling said source and said input circuit, and means to vary the frequency response of said amplifying arrangement comprising a second potentiometer element having three fixed contacts and a movable contact, means to derive from said output circuit a first negative feedback voltage comprising the low frequency portion of said given range of frequencies, means to derive from said output circuit a second negative feedback voltage comprising the intermediate frequency portion of said given range of frequencies, means to apply said first and second negative feedback voltages each to a respective one of said fixed contacts of said second potentiometer, means interconnecting the input circuit of said discharge tube and the third one of said fixed contacts, means comprising an impedance element having a relatively high impedance value at said low and intermediate frequency portions of said given range and a relatively low impedance value at the high frequency portion of said given range intercoupling said output circuit and said movable contact to apply a third negative feedback voltage comprising the high frequency portion of said given range to said input circuit and means intercoupling said movable contact of said second potentiometer and the input circuit of said discharge tube.

5. An electrical circuit arrangement for amplifying an input signal voltage having frequency components within a given range, comprising an electron discharge tube having an input circuit and an output circuit, a source of said input signal voltage, means to continuously vary the amplitude of said signal voltage comprising a first potentiometer element intercoupling said source and said input circuit, and means to vary the frequency response of said amplifying arrangement comprising a second potentiometer element having three fixed contacts and a movable contact, first filter means to derive from said output circuit a first negative feedback voltage comprising the low frequency portion of said given range of frequencies, second filter means to derive from said output circuit a second negative feedback voltage comprising the intermediate frequency portion of said given range of frequencies, capacitive means having a relatively high impedance value at the intermediate frequency portion of said given range and a relatively low impedance value at the high frequency portion of said given range to derive from said output circuit a third negative feedback voltage comprising the high frequency portion of said given range, means to apply said first, second and third negative feedback voltages each to a respective one of said fixed contacts of said second potentiometer and means intercoupling said movable contact of said second potentiometer and the input circuit of said discharge tube.

HENRICUS ADRIANUS BROOS.

REFERENCES CITED

The following references are of record in the file of this patent:

UNITED STATES PATENTS

| Number | Name | Date |
|---|---|---|
| 2,029,523 | Curtis | Feb. 4, 1936 |
| 2,217,178 | Masters | Oct. 8, 1940 |
| 2,217,267 | Eisele | Oct. 8, 1940 |
| 2,282,382 | Root | May 12, 1942 |
| 2,282,870 | Lundie | May 12, 1942 |
| 2,317,025 | Bond | Apr. 20, 1943 |